July 29, 1941.    H. J. APPEL    2,250,453
SUCCESSIVE SWITCHING ARRANGEMENT
Filed July 12, 1938    4 Sheets-Sheet 1

INVENTOR
Henry J. Appel
BY
Ira L. Nickerson
ATTORNEY

July 29, 1941.    H. J. APPEL    2,250,453
SUCCESSIVE SWITCHING ARRANGEMENT
Filed July 12, 1938    4 Sheets-Sheet 2

INVENTOR
Henry J. Appel
BY
Ira L. Nickerson
ATTORNEY

INVENTOR
Henry J. Appel.
BY
Ira L. Nickerson
ATTORNEY

Patented July 29, 1941

2,250,453

UNITED STATES PATENT OFFICE 2,250,453

SUCCESSIVE SWITCHING ARRANGEMENT

Henry J. Appel, Philadelphia, Pa., assignor, by mesne assignments, to Houdry Process Corporation, Wilmington, Del., a corporation of Delaware Application July 12, 1938, Serial No. 218,794

3 Claims. (Cl. 177—311)

This invention relates to a system for automatically controlling and regulating the cycle of steps of industrial processes which are carried out in predetermined sequence and it is particularly concerned with such a system for controlling the flow of different fluid mediums. In certain aspects the invention may be considered as an improvement on or further development of the invention disclosed in the copending application of Henry Thomas, John M. Pierson and Edward J. Nopper, Serial No. 160,122, filed August 20, 1937, for a Cycle timer apparatus.

One object is to provide a system which is capable of regulating processes having varying cycle times and/or numbers of operating steps. Another object is to provide a system for independently controlling operations of mechanisms and independently testing the operations. Another object is to provide independent groups of controls for separately effecting recurring operations of a process. A more specific object is to provide an electrical timing mechanism having isolated control circuits for operating different mechanisms simultaneously and non-interferingly. Various other objects will be manifested as the detailed description proceeds.

In carrying out the invention in accordance with certain preferred applications apparatus is provided having separate groups of control elements wherein predetermined elements of each group are operably associated with mechanisms to be controlled and each group of elements carries out separate operations initiated by means of a movable contact arm put in motion at any desired speed through the medium of a motor and variable gearing and the elements of one group may operate independently of the elements of another group or elements of a plurality of groups may simultaneously function. The number of control elements included in each group may vary greatly and the cycle of operations may begin and end on any selected segments, or the movable contact arm may be moved to initiate operations in either or both paths of travel or a second set of control groups may be used to complete a cycle of operation, one set functioning when the movable contact arm is travelling in one direction while the other set functions when the motion of the arm is reversed. Or according to another application of the invention, each group of control elements may separately control a cycle of operations or the groups may operate serially to control a cycle.

In its broadest aspects the invention is applicable to mechanical as well as electrical control but in the latter application finds its greatest utility in simplicity and compactness of apparatus and certainty of operation. It is within the purview of the invention to electrically separate the control elements of a cycle timer by the use of different kinds of current for actuating elements having different types of operations, such as opening or closing a valve and testing the operation of the valve opening or closing, which may be accomplished by the use of A. C. current for one type of operation and D. C. current for another type, or the same control elements may be used to effect different types of operations and the circuits from the elements may also be electrically isolated from each other by the use of relays or rectifiers.

The objects and novel features of the invention will become evident from the following detailed description and the accompanying figures of the drawings. It will be understood, however, that the particular embodiments of the invention disclosed in the drawings are for the purpose of illustration only and that the invention is not to be limited thereby.

Referring to the drawings wherein similar parts are indicated by like numerals,

Figure 1:
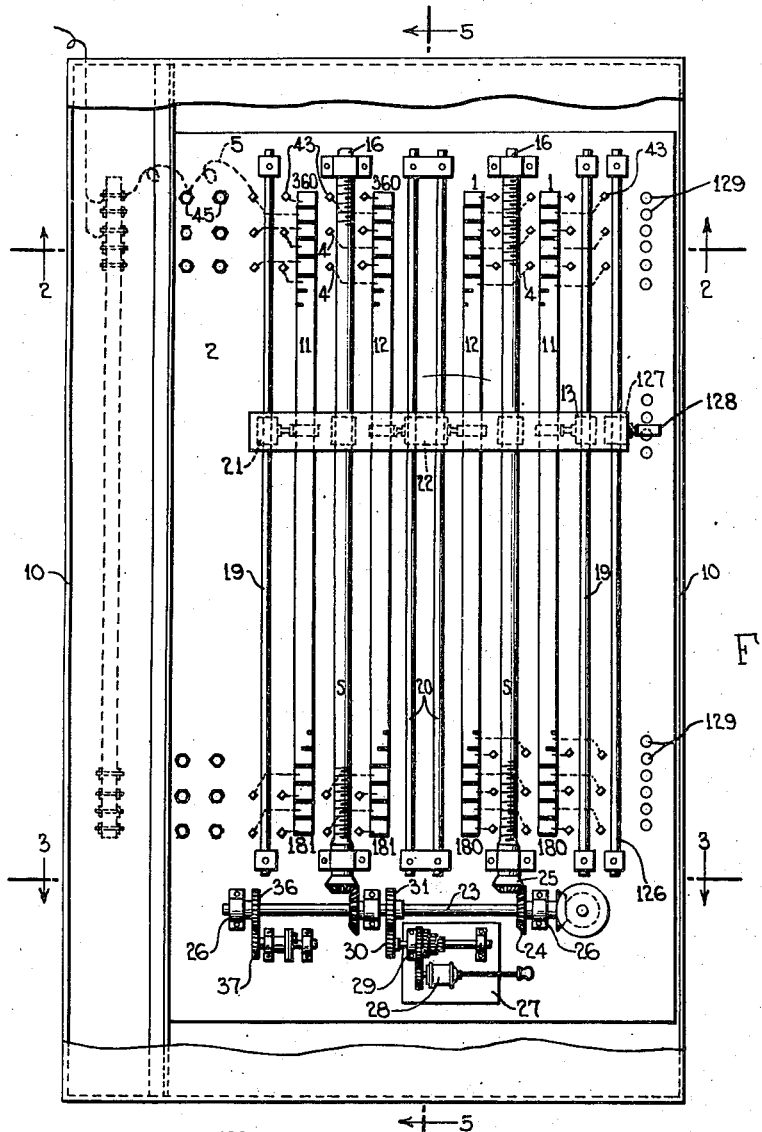
Fig. 1 is a sectional-elevational view of an embodiment of the invention.

Referring to Fig. 1 of the drawings, 10 indicates generally a casing enclosing the timing mechanism which is made up of sets of separate parallel segment groups 11 and 12 of insulated segments which are removably secured to the front face of a panel 2 constructed of insulating material, and a movable arm 13 disposed above the segments and carrying sets of contact brushes 14 and 15 (Fig. 2) to coact with the groups of segments. The segment groups are separated from each other and each group functions to carry out independent operations and although two sets of the segment groups 11 and 12 are shown in the preferred embodiment, the invention may be readily carried out with a single set of two or more segment groups. The movable contact arm 13 is adapted to be reciprocated over the segments to pass the brushes in physical contact therewith and, as shown, the preferred means for moving the arm comprises a plurality of lead screws S which are rotatably held in bearings 16 fixed to the panel and cooperating with movable screw-threaded sleeves 17 enclosed in insulated blocks 18 rigidly held by the brush arm. Two sets of stationary contact guide rails 19, 19 and 20, 20 are secured to the panel and disposed parallel to the segment sets and the arm 13 is slidably associated with the rails by means of suitable guide bearings 21 fixed adjacent the arm ends to receive the rails 19 and a bearing 22 to receive the rails 20. The bearings 21 are made of material capable of conducting electric current from the rails 19 to the brushes 14 for energizing the segments of group 11 while the single bearing 22 carrying both rails 20 should be of insulating material and provided with metallic bushings for conducting current from the rails 20 to the brushes 15 for energizing the segments of group 12 but at the same time insulating the rails from each other, and both sets of rails are electrically connected with the sets of contact brushes 14 and 15 thru flexible leads 3.

Figure 3:
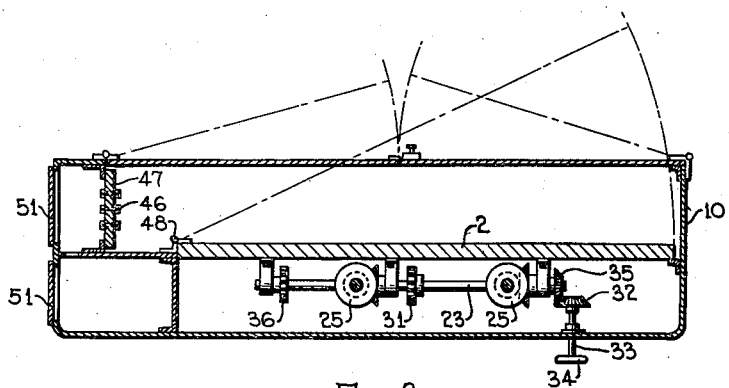
Fig. 3 is a horizontal section on the line 3—3 of Fig. 1.
Figure 5:
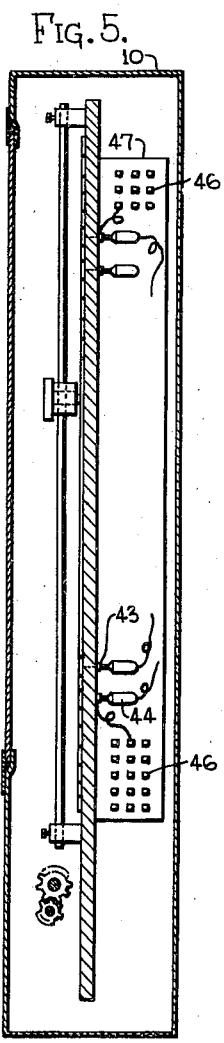
Fig. 5 is a vertical section on line 5—5 of Fig. 1.

The lead screws S are rotated through a shaft 23 having fixed thereon a pair of miter gears 24 adapted to cooperate with similar gears 25 at one end of the screws and the shaft 23 is rotatably secured to the panel by means of suitable bearings 26 and is rotated through the medium of a gear box drive 27 which comprises a reversible synchronous motor 28 and a set of variable ratio gears 29 for driving a pinion 30 at any selected speed, which in turn rotates a gear 31 fixed to the shaft 23. The direction of travel of the arm 13 may be reversed directly through the energization of any selected segment to reverse the motor 28 or it may be reversed by means of a time delay relay actuated by any selected segment. When it is desired to reciprocate the contact arm by hand, the gear box drive 27 may be disengaged from the shaft 23 by a declutching mechanism contained in the gear box and a gear wheel 32 (Fig. 3) connected through a slidable shaft 33 to a hand wheel 34 and may be forced into engagement with a gear 35 disposed at one end of the shaft.

In order to provide a quick make and break contact with the segments of each group 11 and 12; to regulate the time of contact between the brushes and segments; to indicate when the brushes are at the center of the segments; as well as to prevent arcing when the brushes pass over the segments, a mechanical arrangement for actuating a series of mercury switches (clearly shown in Fig. 4) is provided and comprises a gear wheel 36 fixed to shaft 23 which operates an adjustable cam 37 fixed to another shaft 38, through a gear wheel 39 held similarly by the shaft 38, to raise and lower one arm of a bell crank lever 40 pivoted to a bracket 41 and carrying the switches 42, 43, 44. The switches 42 and 43 are electrically connected with the guide rails 19 and 20 respectively at the right of Fig. 1 when the arm 13 is travelling in one direction and alternately electrically connected to rails 19 and 20 at the left of the figure when the arm is travelling in the other direction, and the switch 44 may be connected to a suitable light or other signal.

Figure 2:
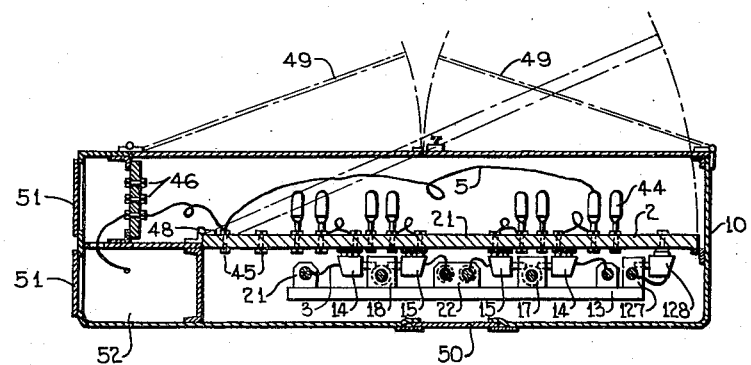
Fig. 2 is a horizontal section on the line 2—2 of Fig. 1.

Each segment of the control groups is joined by leads 4 to hollow connectors 43 located in the panel board and forming receptacles adapted to receive hand plugs 44 which are in turn connected by leads 5 to terminal posts 45 having electrical connections leading to the mechanism to be controlled. The hand plugs 44 are wired to the terminal posts 45 so that any plug may be moved and inserted in any of the hollow connectors. As shown in Fig. 2 these connections lead to terminal posts 46 located in a sub-panel 47 and from the sub-panel all the leads may be grouped together and be confined in compartment 52.

The parts of the control apparatus heretofore described are enclosed within the casing 10 in such a manner that all parts thereof are compactly arranged and easily accessible for repair or replacement. This is accomplished by hinging the panel 2 at 48 in spaced relation to the front and rear faces of the casing and securing the timer parts to either side of the panel as clearly shown in Figs. 2 and 3. The back wall of the casing may be provided with hinged doors 49 which are adapted to swing outwardly to permit the outward movement of the panel for ready access to all the mechanism while the device is operating. The front face of the casing may, as shown, be provided with a glassed opening 50 for giving a ready indication of the position of the contact arm 13 and one end of the casing may be provided with removable doors giving access to the sub-panel terminal posts and lead compartment 52.

In the mechanical operation of the apparatus it will be seen from Fig. 1 the arm 13 will travel from segment 1 or any segment selected as the starting segment downwardly through the rotation of the screws S by the motor, and upon reaching segment 180 or any segment selected as the reversing segment the arm will travel in the reverse direction. The segments of the segment groups 11 and 12 at the right of the figure may control the operations of mechanisms during both directions of travel of the arm or only in one direction and the arm returned to the starting segment by a suitable fast reset motor to begin a new cycle of operations or the sets 11 and 12 at the right of the figure may control the operations of mechanisms only when the arm travels in one direction to carry out only a part of a cycle while the other set at the left of the figure controls the operation of mechanism when the travel of the arm is reversed to complete the cycle of operations and the arm positioned ready for a new cycle.

Two timers of the type shown in Figs. 1-5 may be used in parallel so that one acts as a spare for the other, in which case the extra unit may be electrically connected as is the unit in service but its contact guide rails are not energized and its motor is not normally operated. By means of an adjustable rigid coupling the drive shafts of each unit are connected to rotate together so that the movable contact arm of the spare unit is actuated in synchronism with the contact arm of the one in service. In case the main timer fails to properly function both contact arms will be in the same relative position and the other unit can be put in service by declutching the motor of the faulty unit, clutching the motor of the spare unit and energizing the required contactors for starting the movement of the contact arm in the proper direction and simultaneously energizing the corresponding guide rails or collector rings to pass current to the segments.

Figure 6:
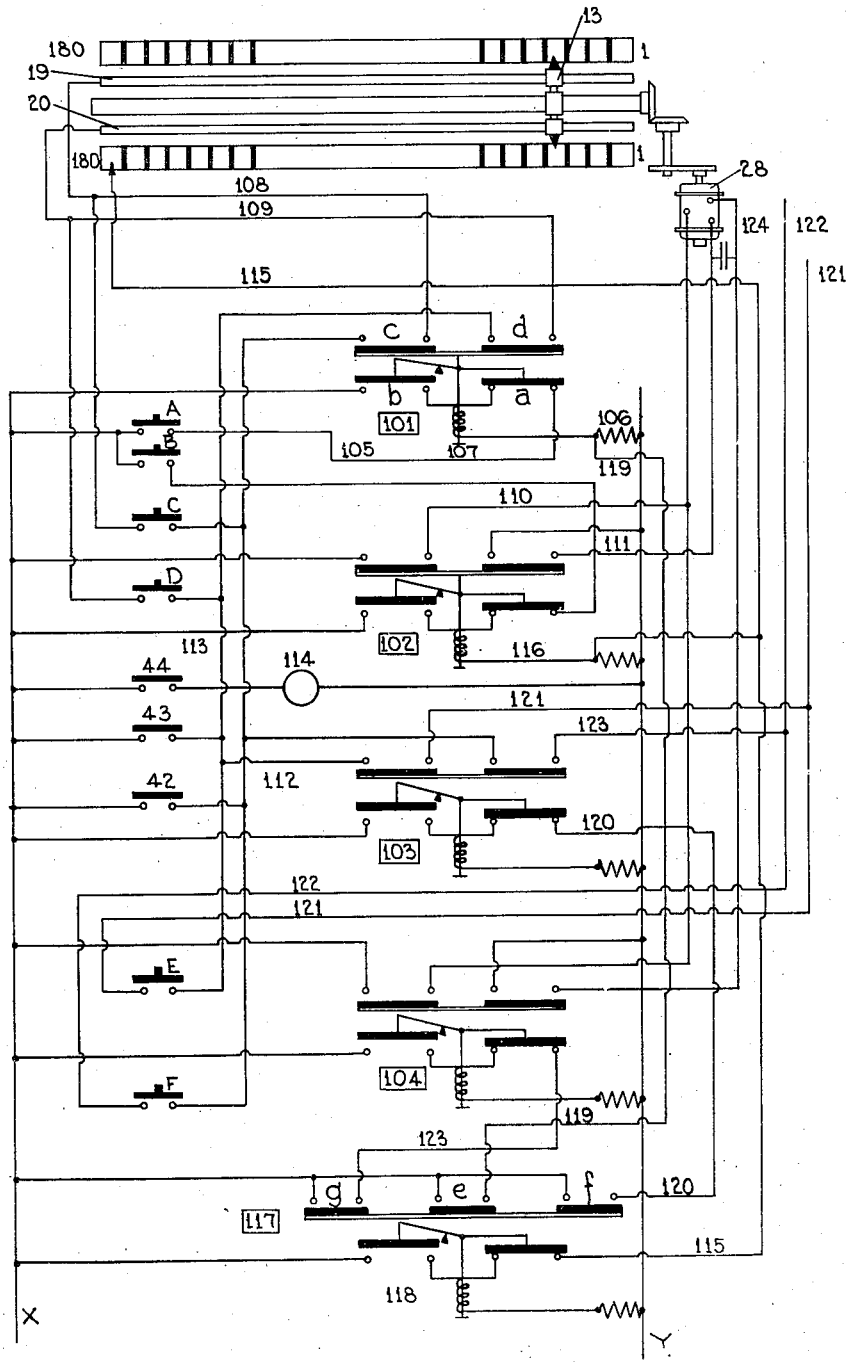
Fig. 6 is a wiring diagram of certain relays and controls for operating the apparatus.

In Fig. 6 the various electrical control circuits are shown applied to a somewhat diagrammatic representation of a timer having two separate groups of segments, each group being adapted for controlling different operations or steps of a process cycle. As indicated, the groups contain 180 segments, this number having been arbitrarily selected but it will be appreciated that the apparatus can function with any desired number of segments. Only segments 1 and 180 are numbered and indicate either the starting and last segment respectively or the starting and reversing segment. If the electrical control circuits are applied to the main embodiment of the invention, segment 180 would act as a reversing segment and the process operations would be effected in both directions of travel of the contact arm.

Power for the various circuits is obtained from the bus lines "$x$" and "$y$" which may supply either alternating or direct current for controlling the contactors, relays, signals, etc., of the apparatus. Four contactors indicated at 101, 102, 103 and 104 are included in the circuit and each is provided with switches $a$, $b$, $c$ and $d$ adapting all the contactors to function similarly in controlling the current flow to the various parts of the apparatus. Before the timer is placed in operation the switches of the respective contactors will all be in the position shown in the diagram and as each contactor becomes energized the position of the switches will be reversed. The switch $a$ will momentarily receive power from the bus lines $x$ and $y$ through the lead 105 and resistance 106 and energize the solenoid 107 closing switches $b$, $c$, and $d$ and opening switch $a$. Switch $b$ acts to hold or seal the current flow through the closed switches $c$ and $d$ until the contactors again become deenergized. Since the contactor switches are similar the reference characters are indicated only in connection with contactor 101.

Figure 4:
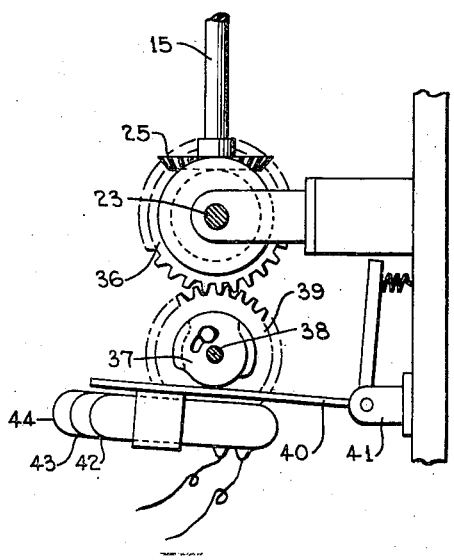
Fig. 4 is a detail of Fig. 1.

To start the timing apparatus the control switches A and B are closed, supplying power from the bus lines $x$ and $y$ to the contactor 101, which is connected to the guide rails 19 and 20 through its switches $c$, $d$ and leads 108 and 109 and simultaneously supplying power to contactor 102 which is connected to the motor 28 through its switches $c$, $d$ and leads 110 and 111. The motor drives the shaft 23 and moves the arm 13 by means of the screws S from segment 1 towards segment 180 and the adjustable cam 37 heretofore referred to in the description of Fig. 4 is simultaneously rotated through the shaft 23 to raise and lower the mercury switches 42 and 43 to open and close the circuit and periodically supply current to the guide rails 19 and 20 through leads 112 and 113 which are connected with the contact rail leads 108 and 109 for providing momentary impulse to the segments at approximately the time the brushes reach the middle of each segment. Mercury switch 44, which is simultaneously rocked by the cam 37, closes the circuit to a light signal 114 for indicating the time the control brushes reach the center of the segment and the impulses are given. The segments which are connected to mechanisms to be operated are energized at the time the impulse is given and the respective operations of the mechanisms are carried out until segment 180 is reached or until any segment is reached which has been selected to reverse the direction of travel of the arm 13 and this segment is connected to contactor 102 through lead 115 and tap-off 116, causing contactor 102 to become deenergized and the motor 28 stopped. Simultaneously a time delay relay 117 which has been set to reverse the motor and cause the arm 13 to begin its travel in the reverse direction by the end of the time period it takes the arm to pass between segments, energized through lead 115 and switches $e$, $f$ and $g$ becomes closed through solenoid operated mechanism 118, the switch $e$ deenergizes contactor 101 to which it is connected through lead 119 and releases the current from the contact guide rails 19 and 20. Within the time period for which the time delay relay is set, the power may again be restored to rails 19 and 20 from which it was released by reenergizing contactor 101, and by using interposing relays in the circuits the same cycle of operations may be carried out while the arm is reversing as was effected during the previous travel of the arm, or the cycle of operations may be completed in the reverse travel of the arm. If two sets of segment groups are used as illustrated in Fig. 1 the current will be transferred by contactor 103 when relay 117 closes switch $f$ which is connected to contactor 103 by lead 120 to pass current from the contactor to the second set of contact rails by leads 121 and 122 and only the second set of segment groups function as the arm reverses its direction of travel. Switch $g$ energizes the contactor 104 through lead 123 and the motor is reversed through lead 124 connecting the contactor 104 with the motor. A second time delay relay similar to relay 117 may be connected with the top segment of the second set of segments to reverse the motor after the cycle is completed or relay 117 may be used and function to reverse the direction of travel of the arm upon the completion of a cycle. A mechanical interlock is provided between contactors 101 and 103 which control the current flow to the contact rails and likewise the contactors 102 and 104 controlling the motor are interlocked so that it is only possible to have one current controlling contactor and one motor controlling relay operating at one time.

It is preferred to use a time delay relay for reversing the direction of travel of the arm 13 since it permits the time interval between segments to elapse before the reversal of the operation of the apparatus takes place. However the time delay relay may be eliminated and the operation of the apparatus reversed by providing an extra segment for reversing the motor after segment 180 or after any segment selected as the last operating segment and reenergizing the contact rails or transferring the current to a second set of rails. The reversing segments may also be used to stop the main motor drive and cut in a fast reset motor for returning the arm to the starting segment within the time required for the arm to pass between segments when driven by the main motor.

If it is desired to manually operate the apparatus, the motor 28 is declutched and the time delay relay 117 is disconnected from service and the switch A only is closed, closing contactor 101 which supplies power to the guide rails 19 and 20 as in the automatic operation. The arm 13 may then be moved by rotating the drive shaft by hand to effect the operation of the timer to sequentially control the steps of process. When it is necessary to control only a few operations of a process rather than all the operations the contact arm is moved manually and current supplied to the selected segment or segments only when the brushes are in contact with the segments. All of the contactors will be in open position and no current flowing to the contact rails, but as the arm passes over each segment of the timer a signal will be given by the light 114 at the time the arm is at the center of each segment, by mercury switch 44 which is rocked by the cam 37 closing the circuit between the bus lines x and y. At the time the signal is made on the segment on which it is desired to carry out an operation the switch C is closed, passing current to the contact rail 19 or switch D is closed, passing current to the contact rail 20, depending on which group of segments contains the desired operating segment or segments. A second pair of switches E, F, may be provided when another set of segment groups is utilized for completing the cycle of operations as in the embodiment of Fig. 1 and these switches when closed can pass current directly to the other set of contact rails through leads 121 and 122.

Figure 7:
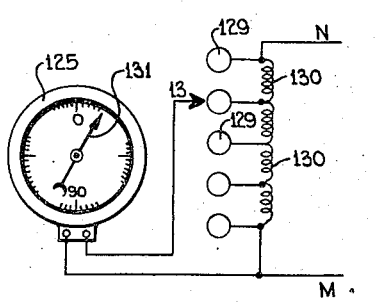
Fig. 7 is a diagrammatic view of a detail.

Fig. 7 discloses an apparatus which may be utilized to indicate at a remote point the position of the contact arm relative to the actuating segments if for any reason a timer is so located as not to be readily visible in order to give directly the position of the contact arm. The apparatus may take the form of a conventional voltmeter shown generally at 125 having a dial graduated into sufficient divisions to give an indication of each segment as the brush arm comes in contact therewith and as shown is provided with 180 divisions adapting it for use with the embodiments of the invention shown in the drawings. An arrangement for using the indicating apparatus is disclosed in connection with Fig. 1 and includes an additional contact rail 126 fixed to the panel 2 and a cooperating slide bearing 127 secured to the arm 13 which is connected to an additional contact brush 128 by a suitable lead for conveying current thereto. A series of buttons 129, preferably one for each actuating segment is fixed to the panel and positioned to coact with the brush 128 as the arm is moved. The contacts 129 are interconnected by means of resistance 130 of equal value and all the resistances are connected across a constant direct current source through bus lines M, N; while the voltmeter is connected across M and contact arm 13 to complete the circuit. The voltmeter functions as an indicator by employing the potential drop across the resistances 130 and as the brush 128 successively contacts the buttons 130, the indicating arm 131 travels in a clockwise direction indicating the segment with which the arm 13 is in contact. When a second set of segment groups is used for completing the cycle in the reverse direction of travel of the arm an extra guide rail, contact brush and set of contact buttons may be provided and the dial graduated into 360 divisions or different colored lights or other signals may be used to denote the direction of travel of the arm.

Figure 8:
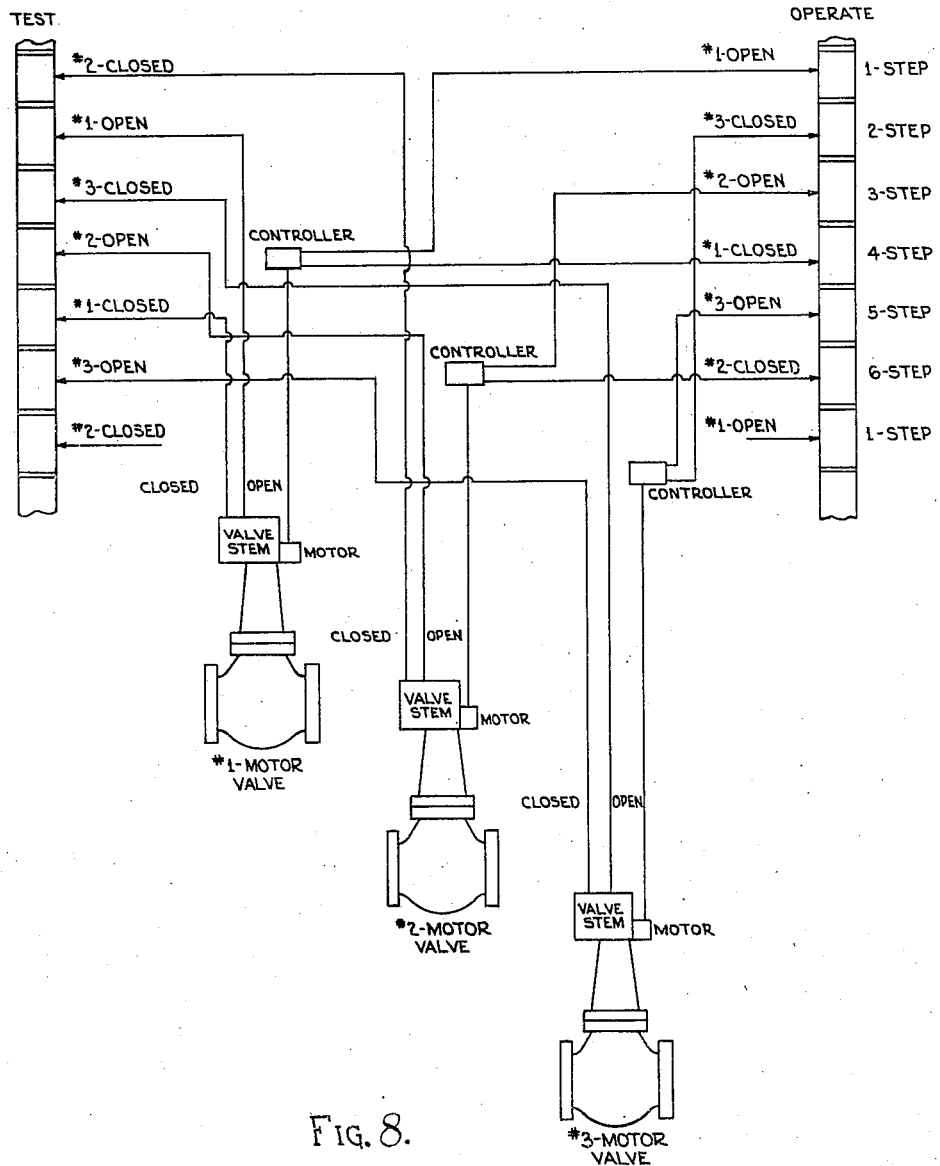
Fig. 8 is a generally diagrammatic view showing the invention applied to the control of valves.

In Fig. 8 of the drawings is shown a diagrammatic view of the invention applied to the control of a series of three motor operated valves each of which may be assumed to control the flow of different fluids to a reaction chamber, for example, wherein it is necessary to admit the fluids to the chamber separately and withdraw one fluid before admitting another fluid in order to prevent any mixture thereof. The sets of segments are physically separated for the purpose of carrying out independent operations, and as indicated one set may be considered as the operating set and function to open or close the valves while the other set acts to test the operations, or the opening or closing of the valves. Only sufficient actuating segments are shown in each set to carry each valve successively through its "opening," "testing the opening," "closing" and "testing the closing" operations and as indicated in the figure the cycle is completed in twelve steps or six successive actuations effected by the contact arm to simultaneously carry out a testing and operating step. The length of time between steps may be determined readily from the complete cycle time of all the steps of a particular process and the motor and variable gearing set to drive the contact brushes at the desired rate of speed between segments.

Assume a cycle of steps to begin at the top segment of the operating group and testing group and that the contact arm has reached these segments which are connected with the motor of valve 1 to effect its opening and the stem of valve 2 to test the closing of this valve; when the timing cam energizes the brushes approximately at the time the brushes reach the center of the segments to give a momentary impulse to the segments, the motor of valve 1 is started and the valve begins to open and at the same time the stem of valve 2 which had been closed in the previous cycle of operations is tested to see if it is properly closed and if valve 2 is not properly closed the movement of the contact arm will immediately cease and the control current to the timer is simultaneously released through suitable means such as a switch controlled by the valve operation as disclosed in Fig. 1b of the aforesaid copending application of Henry Thomas, John M. Pearson and Edward J. Nopper. If valve 2 tests properly closed, the brush continues its movement and reaches the center of the next or predetermined segments of the operating and test sets, and valve 3 which had been opened and tested for opening during the previous cycle is closed by the operating segment and simultaneously valve 1 is tested by the test segment with which the brushes are in contact to see if valve 1 has properly opened on the actuation of the top operating segment. The operation continues as shown in the diagram until all the valves have been opened and tested for opening and closed and tested for closing and a cycle begins with the opening of valve 1 and testing of valve 2 for closing and the cycle repeated.

The invention finds particular utility in complex chemical processes such as refining, treatment or conversion of hydrocarbons from any source, especially when the transformation is carried out in the presence of contact masses which may be inert or possess catalytic activity such as metals in solid or finely divided form or porous solids including blends of silica and alumina of natural or artificial origin with or without the addition of other active materials including metals or metallic compounds. Such masses often become reduced in activity by carbonaceous or other contaminating deposits during reaction periods and after a time it is necessary to regenerate the contact material, which step may be carried out while the mass remains in the reaction chamber. Before regeneration, the reaction chamber must be freed of any hydrocarbons remaining therein, which is done by imposing a vacuum thereon or by purging the case with steam or other inert gaseous medium. The regeneration of the mass is usually effected by admitting an oxidizing gas, such as heated air to the reaction chamber for burning the deposit and before admitting hydrocarbon vapors to the chamber after regeneration the residual products of combustion and of oxidizing medium must be removed from the chamber and this may be accomplished by again utilizing a vacuum or by admitting steam or other inert fluid. The various fluids used in a cycle of operation are usually admitted to the chamber by a common inlet and removed therefrom by a common outlet and it is essential that absolute control of the valves for the various fluids be maintained in order to eliminate any mixture thereof which might become hazardous. In order to efficiently carry out the process a plurality of reaction chambers is used, of which some will be receiving hydrocarbon vapors, while others are being purged and still others being regenerated. In Fig. 1B of the aforesaid copending application of Henry Thomas, John M. Pierson and Edward J. Nopper, an apparatus is diagrammatically shown for actuating a series of switches in controlling the sequential operation of valves and regulating the flow of different fluids to a group of reaction chambers which are utilized in a process of transforming hydrocarbons and the present invention is readily adaptable to control such operations. In some instances it may be desirable to use six, nine or twelve or more reaction chambers which may necessitate using a hundred or more valves for the proper control of the different fluids to the various chambers and to open, close or test a plurality of valves at one time by connecting more than one valve to a single actuating segment. It will be readily appreciated how the apparatus of the present invention may be adapted to the control of any number of valves because of the great latitude of choice of numbers of segments which may be provided in a set and the flexibility of the apparatus in its adaptability to processes having varying cycles of time and numbers of steps. Apparatus aspects of the present invention are disclosed and claimed in my copending divisional and continuation-in-part application Serial No. 371,181, filed December 21, 1940.

What I claim is:

1. A system of control for a group of valves used in a cycle of operation and wherein during the cycle the valves are operated at predetermined timed intervals and the valves tested after each operation is completed which comprises a motor for operating each valve, an operating circuit for each valve motor, a controller switch for energizing the motor operating circuits, means for maintaining said motor operating circuits energized for predetermined time periods, an independent electrical test circuit for each valve, said controller switch being timed to energize a valve motor operating circuit and a valve test circuit simultaneously and to maintain at least one valve motor operating circuit in energized condition while the condition of operation of a valve by a previously energized operating circuit is tested, a control circuit for deenergizing an energized valve motor operating circuit, switch means controlled by each valve operation and being operable when a tested valve shows improper operation to cause said control circuit to stop the operation of a valve motor.

2. An automatic control for a group of valves which are operated over a predetermined time period to regulate the flow of fluids during a process cycle and wherein at least two of the valves are in the course of operation at the same interval of time comprising motive means for operating each valve, an operating circuit for each motive means, a time control switch for energizing the operating circuits in sequence, means for maintaining said operating circuits energized for predetermined time periods, an independent electrical test circuit for each valve, each test circuit being energized simultaneously with the energization of a valve motor operating circuit for testing a valve whose motor operating circuit has been energized for its predetermined time period, a control circuit for deenergizing the motor operating circuits, switch means controlled by each valve operation and being operable when a tested valve shows improper operation to cause said control circuit to instantly deenergize the motor operating circuits.

3. An automatic control for a group of valves at least two of which are operating during a predetermined time period of a process cycle, to regulate the flow of processing fluids, comprising motors for operating each valve, an electrical power source, a plurality of independent sets of contacts, an energizer for supplying power from said source to energize simultaneously a contact of each set, independent electrical operating circuits from contacts of one set for supplying current therefrom to the valve motors, means for maintaining said operating circuits energized for predetermined periods of time, an independent electrical test circuit for each valve from contacts of the other set, said energizer being time-controlled to maintain at least two operating circuits energized during a time interval of the cycle and simultaneously with each energization of an operating circuit to energize a test circuit of a valve whose operating circuit has been energized for its predetermined time period in order to test the operation of said valve, a control circuit for deenergizing all energized valve motor operating circuits, switch means controlled by each valve operation and being operable when a tested valve shows improper operation to cause said control circuit to stop the operation of all valve motors.

HENRY J. APPEL.